United States Patent
Mossman

(10) Patent No.: US 9,814,178 B2
(45) Date of Patent: Nov. 14, 2017

(54) SUPPORT BRACKET FOR COMBINE HEADER

(71) Applicant: Deere & Company, Moline, IL (US)

(72) Inventor: Michael W. Mossman, Silvis, IL (US)

(73) Assignee: Deere & Company, Moline, IL (US)

( * ) Notice: Subject to any disclaimer, the term of this patent is extended or adjusted under 35 U.S.C. 154(b) by 104 days.

(21) Appl. No.: 14/869,601

(22) Filed: Sep. 29, 2015

(65) Prior Publication Data

US 2017/0086371 A1 Mar. 30, 2017

(51) Int. Cl.
| | | |
|---|---|---|
| *A01D 43/00* | (2006.01) | |
| *A01D 41/12* | (2006.01) | |
| *A01D 41/06* | (2006.01) | |
| *A01D 41/14* | (2006.01) | |
| *A01D 57/20* | (2006.01) | |

(52) U.S. Cl.
CPC ............. *A01D 41/12* (2013.01); *A01D 41/06* (2013.01); *A01D 41/14* (2013.01); *A01D 57/20* (2013.01)

(58) Field of Classification Search
CPC ...... A01D 41/144; A01D 41/14; A01D 57/20; A01D 61/002; A01D 41/16
USPC ......................................... 403/398, 385, 400
See application file for complete search history.

(56) References Cited

U.S. PATENT DOCUMENTS

| | | | |
|---|---|---|---|
| 4,409,780 A | 10/1983 | Beougher et al. | |
| 4,573,308 A * | 3/1986 | Ehrecke | A01D 41/14 56/14.4 |
| 7,992,372 B1 * | 8/2011 | Coers | A01D 41/14 56/153 |
| 8,087,224 B1 | 1/2012 | Coers et al. | |
| 9,526,210 B2 * | 12/2016 | Schulze Selting | A01D 41/12 |
| 2003/0074876 A1 * | 4/2003 | Patterson | A01D 41/14 56/257 |
| 2008/0295473 A1 * | 12/2008 | Tippery | A01D 41/144 56/14.5 |
| 2012/0291412 A1 * | 11/2012 | Lovett | A01D 61/002 56/181 |
| 2014/0215992 A1 | 8/2014 | Schraeder | |

FOREIGN PATENT DOCUMENTS

EP          2524590          11/2012

OTHER PUBLICATIONS

EP161889191 Extended European Search Report dated Dec. 12, 2016 (9 pages).

* cited by examiner

*Primary Examiner* — Arpad Fabian-Kovacs
(74) *Attorney, Agent, or Firm* — Michael Best & Friedrich LLP

(57) ABSTRACT

A header for an agricultural harvesting machine includes a cutting bar for cutting agricultural material, a first frame portion, a second frame portion, and a bracket assembly for pivotably coupling the second frame portion to the first frame portion. The first frame portion includes a conveyor for moving cut material and a pair of supports. The first frame portion also includes a pin extending between the supports and secured to the supports. The second frame portion includes a conveyor for moving cut material. The bracket assembly includes a first portion and a second portion removably coupled to the first portion such that the pin is positioned between the first portion and the second portion.

20 Claims, 8 Drawing Sheets

SUPPORT BRACKET FOR COMBINE HEADER

BACKGROUND

The present disclosure relates to agricultural harvesting machines, and particularly to a header for a combine harvester.

Conventional combine harvesters include a header for gathering agricultural material. The header may include various cutting implements, depending on the type of crop. After being cut, the material is conveyed toward a center of the header, where it is transferred to a feederhouse. The feederhouse includes an elevator for moving the cut material toward a threshing rotor where the material is broken apart.

SUMMARY

In one aspect, a header for an agricultural harvesting machine includes a cutting bar for cutting agricultural material, a first frame portion, a second frame portion, and a bracket assembly for pivotably coupling the second frame portion to the first frame portion. The first frame portion includes a conveyor for moving cut material and a pair of supports. The first frame portion also includes a pin extending between the supports and secured to the supports. The second frame portion includes a conveyor for moving cut material. The bracket assembly includes a first portion and a second portion removably coupled to the first portion such that the pin is positioned between the first portion and the second portion.

In another aspect, an agricultural harvesting machine includes a chassis, a rotor for breaking agricultural material, and a header for cutting and gathering agricultural material. The header includes a cutting bar for cutting agricultural material, a first frame portion, a second frame portion, and a bracket assembly for pivotably coupling the first frame portion to the second frame portion. The first frame portion includes a conveyor for moving cut material. The first frame portion includes a pair of supports and a pin extending between the supports and secured to the supports. The second frame portion includes a conveyor for moving cut material. The bracket assembly includes a first portion and a second portion removably coupled to the first portion such that the pin is positioned between the first portion and the second portion.

In yet another aspect, a method is provided for coupling a first frame portion of a header for an agricultural harvesting machine to a second frame portion of the header, the first frame portion being movable relative to the second frame portion. The method includes: inserting a pin between a pair of support members on the first frame portion; positioning the pin in a trough formed on a first bracket portion secured to the second frame portion; and securing a second bracket portion to the first bracket portion such that the pin is positioned between the first bracket portion and the second bracket portion.

Other aspects will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

Figure 1:
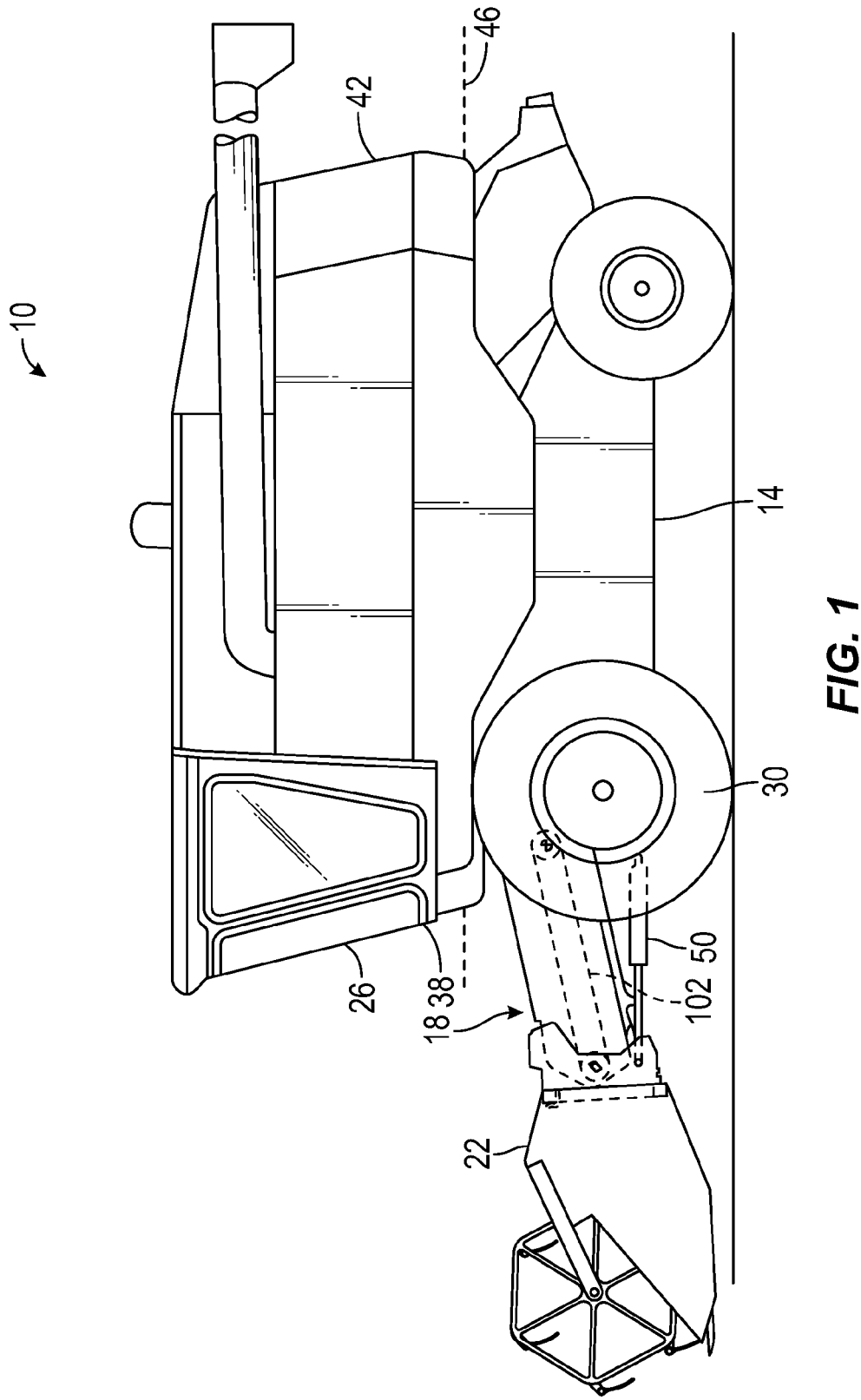
FIG. 1 is a side view of a harvester.

FIG. 1 illustrates a combine harvester 10 including a vehicle frame or chassis 14, a feeder throat or feederhouse 18, and a harvester header 22 for cutting crop plants. The chassis 14 includes an operator cab 26 and traction elements (e.g., wheels 30) for supporting and moving the chassis 14 with respect to the ground. The chassis 14 includes a first or forward end 38 and a second or rear end 42, and a chassis axis 46 extends between the forward end 38 and the rear end 42. The feederhouse 18 is supported on the forward end 38 of the chassis 14 and may be pivoted relative to the chassis 14 by an actuator (e.g., a fluid cylinder 50).

Figure 2:
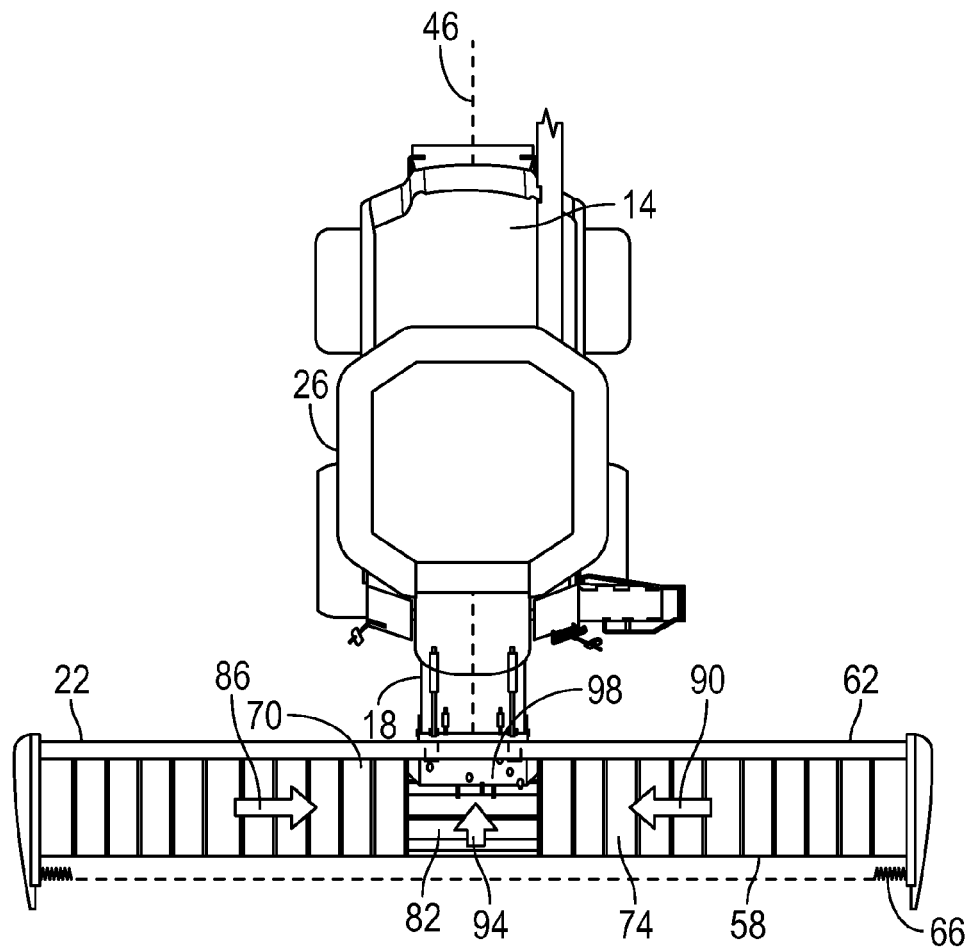
FIG. 2 is a top view of the harvester of FIG. 1.

As shown in FIG. 2, the header 22 is supported on an end of the feederhouse 18 and extends transversely to the chassis axis 46. As used herein, "transverse" generally refers to an orientation that is perpendicular to the chassis axis 46 of the harvester 10 and that extends laterally between a first side of the harvester 10 and a second side of the harvester 10. In the illustrated embodiment, the header 22 is wider than the chassis 14. The header 22 includes a forward edge 58, a rear edge 62, and a cutting bar 66 coupled to the forward edge 58. The cutting bar 66 extends substantially along the width of the header 22 and cuts or separates crop plants (not shown) from the ground as the harvester 10 moves along the ground.

The header 22 supports a first or right side conveyor 70, a second or left conveyor 74, and an intermediate or center conveyor 82 positioned between the right side conveyor 70 and the left side conveyor 74. In the illustrated embodiment, the center conveyor 82 is aligned with the chassis 14 centerline and the chassis axis 46, and each of the conveyors 70, 74, 82 are formed as endless belt conveyors. As the cutting bar 66 severs planted crops from the ground, the cut material falls onto the conveyors 70, 74, 82. The right side conveyor 70 moves cut material in a first direction 86 toward the center conveyor 82, and the left side conveyor 74 moves cut material in a second direction 90 toward the center conveyor 82. The center conveyor 82 moves the cut material in a third direction 94 past a feed drum 98 and toward the feederhouse 18. After passing into the feederhouse 18, an elevator 102 (FIG. 1) moves the cut material into a threshing mechanism (not shown) supported on the chassis 14.

Figure 3:
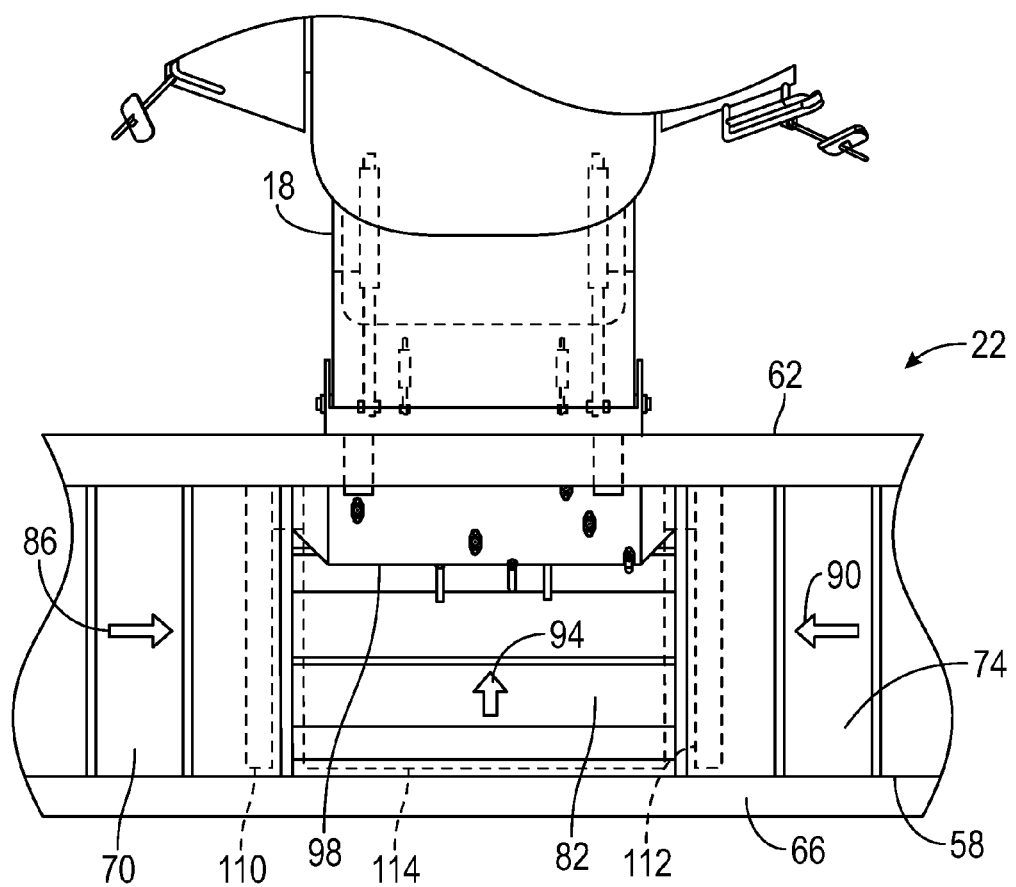
FIG. 3 is a top view of a feederhouse and a portion of a header.

The right side conveyor 70 and the left side conveyor 74 are supported on a first or floating frame portion and the center conveyor 82. As shown in FIG. 3, a float arm 110 supports a portion of the right side conveyor 70 and is positioned adjacent the center conveyor 82. A similar float arm 112 supports a portion of the left side conveyor 70 and is positioned adjacent the other side of the center conveyor 82. The center conveyor is supported on a second frame portion or flex frame 114. In the illustrated embodiment, the floating frame portion is formed as separate floating frame portions on either side of the flex frame 114 portion, and each of the separate floating frame portions supports one of the side conveyors 70, 74. The floating frame portions allow the side conveyors 70, 74 to move vertically independent of the flex frame 114 as the header 22 moves over the ground.

Figure 4:
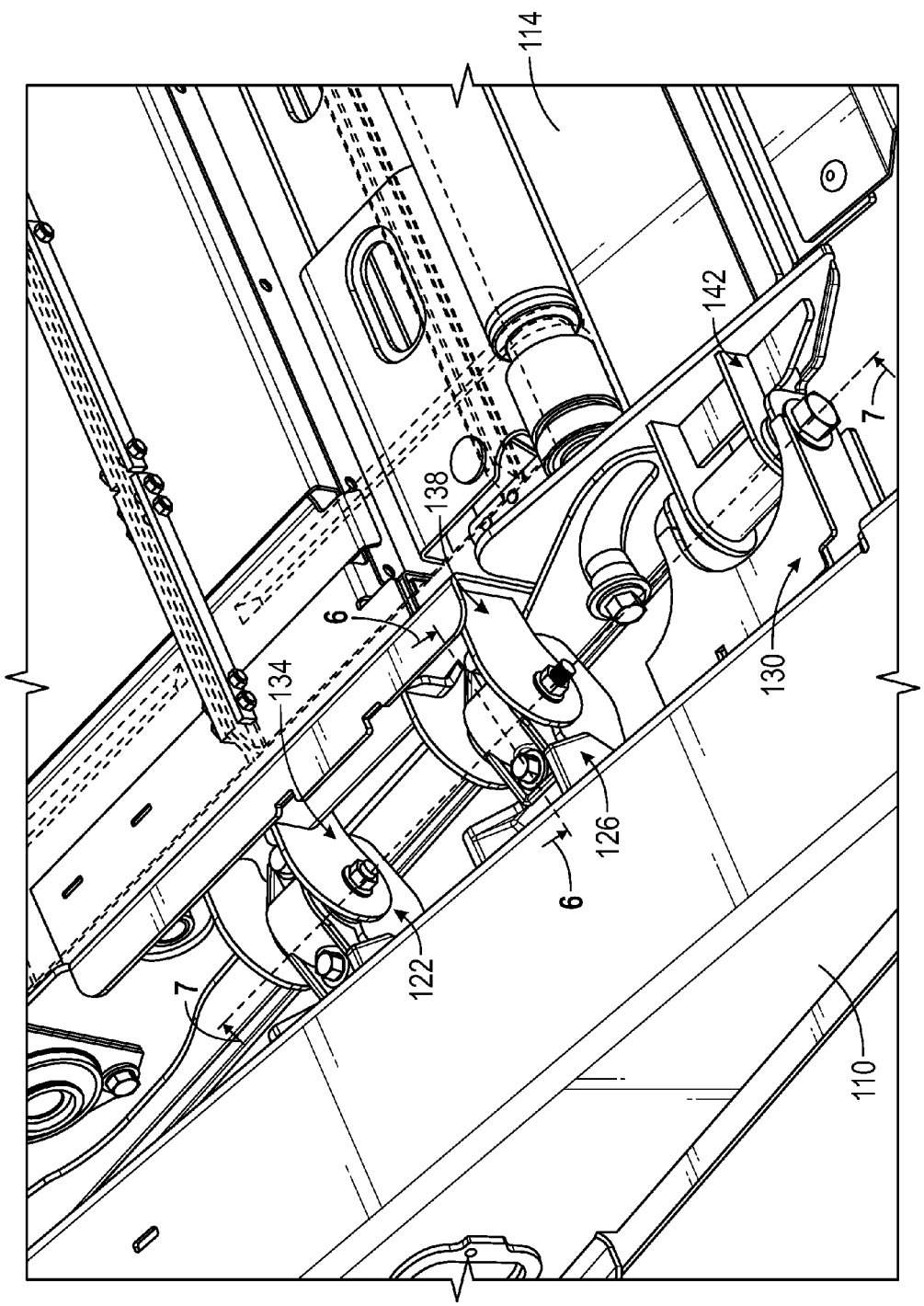
FIG. 4 is a perspective view of a portion of a flex frame and a float arm.
Figure 5:
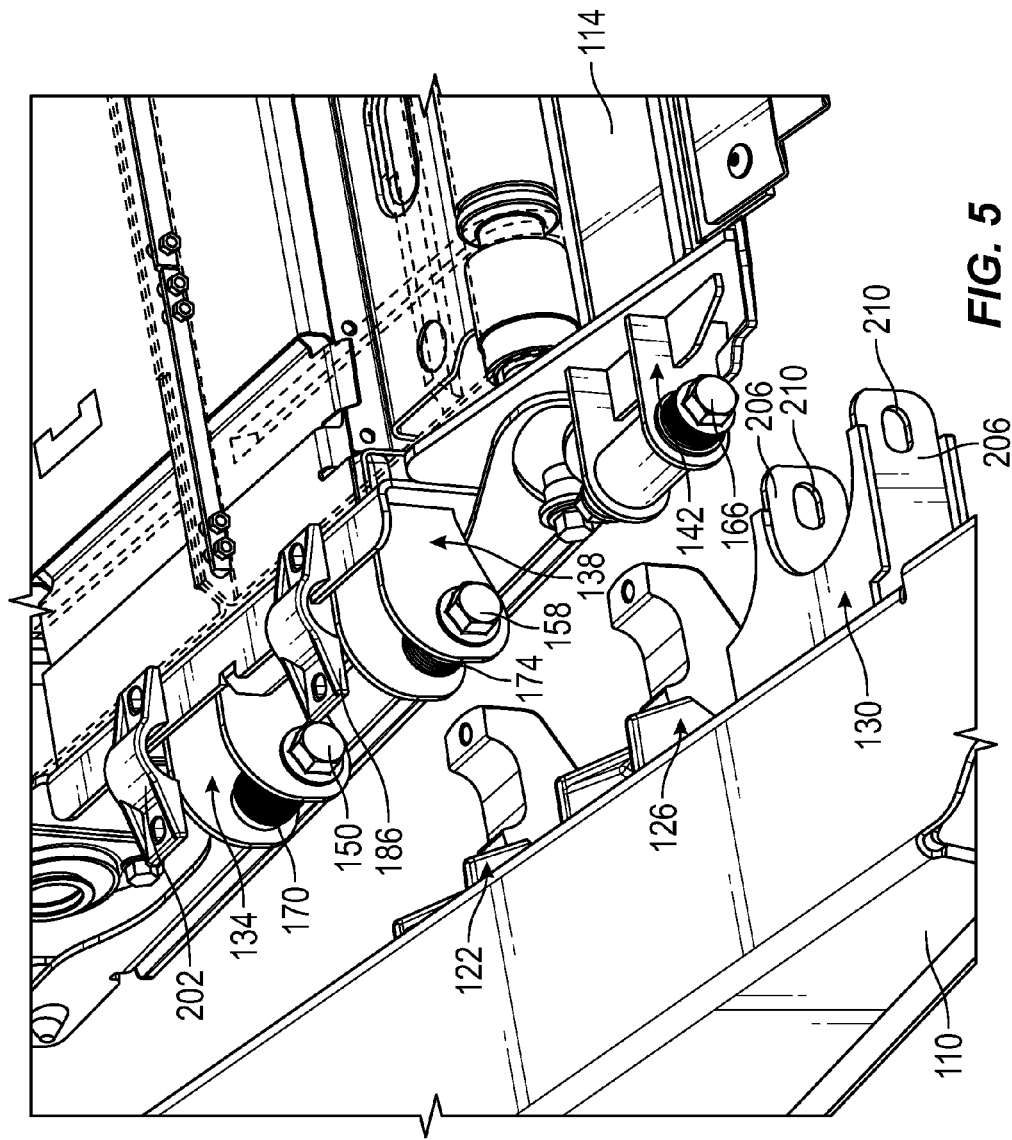
FIG. 5 is a perspective view of the flex frame of FIG. 4 with the float arm disconnected.

FIGS. 4 and 5 illustrate the float arm 110 of one of the floating frame portions. The float arm 110 is positioned adjacent the flex frame 114 supporting the center conveyor 82 (FIG. 3). The float arm 110 includes a first bracket 122, a second bracket 126, and a third bracket 130. Similarly, a side of the flex frame 114 includes a first support 134, a second support 138, and a third support 142. The first support 134 is coupled to the first bracket 122, the second support 138 is coupled to the second bracket 126, and the third support 142 is coupled to the third bracket 130. In the illustrated embodiment, the float arm brackets 122, 126, 130 and flex frame supports 134, 138, 142 are pivotably connected to one another by a pin connection, allowing the float arm 110 to move relative to the flex frame 114. Also, in the illustrated embodiment, the brackets 122, 126, 130 are formed on the float arm 110 and the supports 134, 138, 142 are formed on the flex frame 114; in other embodiments, the supports may be formed on the float arm 110 and the brackets may be formed on the flex frame 114.

Referring now to FIG. 5, in the illustrated embodiment, the flex frame supports 134, 138, 142 are each formed as a pair of parallel flanges extending from a side of the flex frame 114. A first pin or bolt 150 extends between and is secured to the flanges of the first support 134. Similarly, a second pin or bolt 158 extends between and is secured to the flanges of the second support 138. A third pin or bolt 166 extends between and is secured to the flanges of the third support 142. In the illustrated embodiment, a first isolator bushing 170 extends around the first bolt 150 and a second isolator bushing 174 extends around the second bolt 158. In one embodiment, the isolator bushings 170, 174 are formed from rubber. The isolator bushings 170, 174 provide a resilient element that allows the center flex frame 114 to move independently of the floating frame portions as the cutting bar 66 (FIG. 3) moves through its vertical range. The isolator bushings 170, 174 also reduce vibrations between the center flex frame 114 and the float arm 110.

Figure 6:
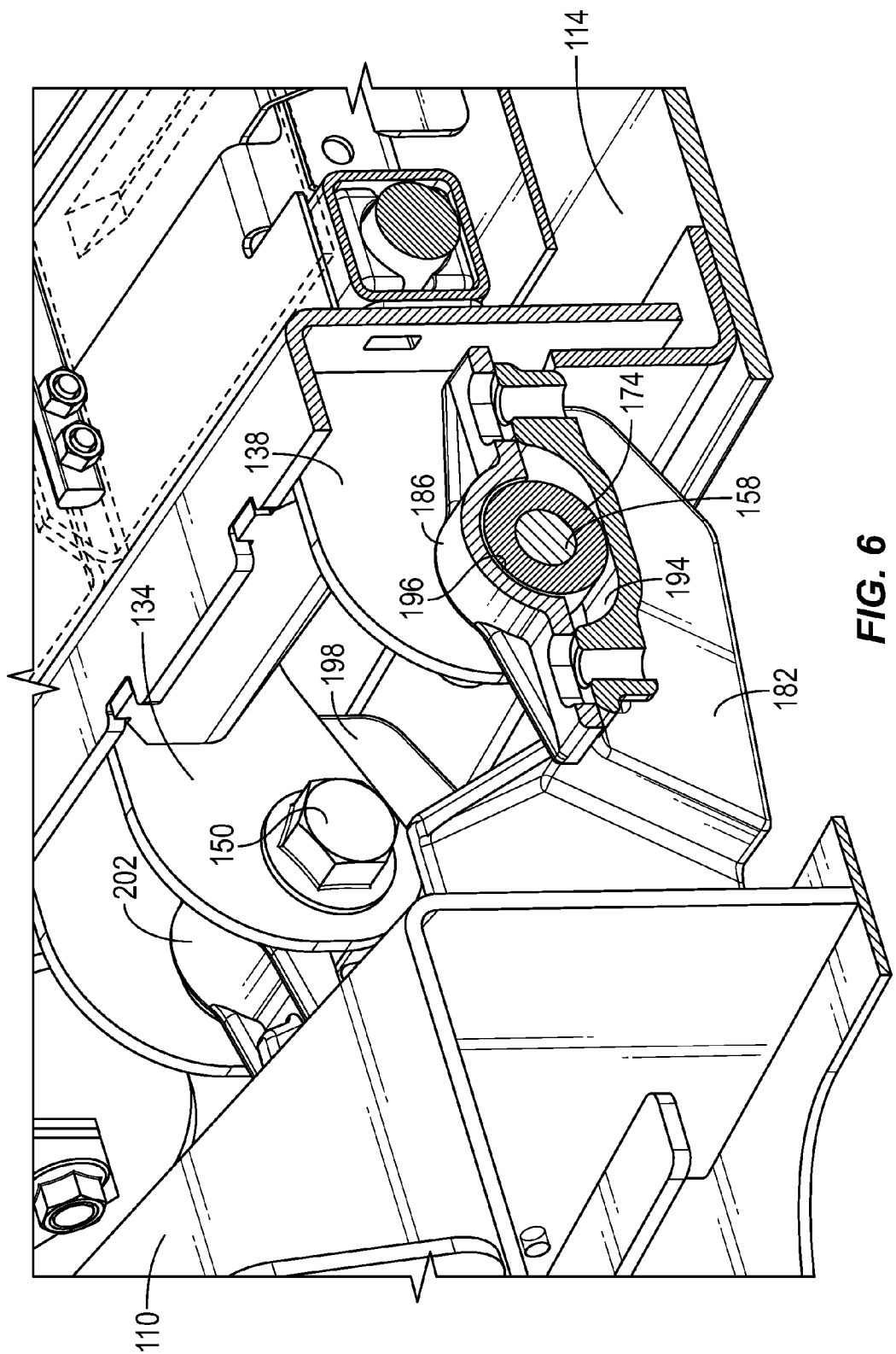
FIG. 6 is a sectional perspective view of the flex frame and float arm of FIG. 4 viewed along section 6-6.
Figure 8:
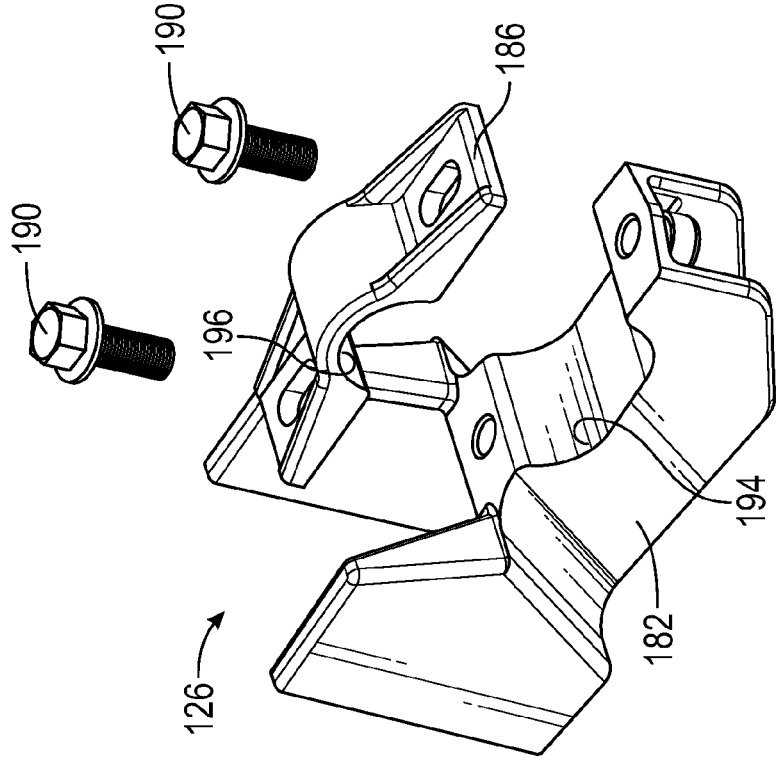
FIG. 8 is an exploded view of a bracket.

Referring to FIG. 6, the second bracket 126 includes a first or lower portion 182 secured to the float arm 110, and a second or upper portion or cap 186 removably coupled to the lower portion 182 (e.g., by fasteners 190—FIG. 8). In the illustrated embodiment, the lower portion 182 is formed as a U-shaped member defining a cradle or trough 194 and the cap 186 includes a groove 196 such that the trough 194 and the groove 196 form an enclosed, round opening when the cap 186 is secured to the lower portion 182. In the illustrated embodiment, a line of separation between the lower portion 182 and the cap 186 passes substantially through the center of opening formed between the lower portion 182 and the cap 186. Stated another way, the opening is substantially symmetric about the line of separation between the lower portion 182 and the cap 186.

The second bolt 158 is positioned within the trough 194, and the cap 186 is secured to the lower portion 182 to capture the second bolt 158 and the second isolator bushing 174 within the trough 194 and groove 196. The cap 186 may be secured against the lower portion 182 so that the cap 186 and lower portion 182 exert a compressive force on at least a portion of the second isolator bushing 174. Although the second bracket 126 is shown in detail in FIG. 6, it is understood that the first bracket 122 includes a lower portion 198 and an upper portion or cap 202 that engage the first bolt 150 and first isolator bushing 170 in a similar manner to the second bracket 126.

Referring again to FIG. 5, in the illustrated embodiment, the third bracket 130 includes a pair of float arm flanges 206, and each float arm flange 206 includes a hole 210. The third bolt 166 passes through the float arm flanges 206 to secure the third bracket 130 to the third support 142. In other embodiments, the third bracket 130 may be constructed similar to the first bracket 122 and the second bracket 126 (i.e., the third bracket 130 may be formed as separable lower and upper portions).

To couple the float arm 110 to the center flex frame 114, the first bolt 150 is positioned in the first support 134 and the second bolt 158 is positioned in the second support 138. The float arm flanges 206 are aligned with the flanges of the third support 142 and the third bolt 166 is passed through the float arm flanges 206 and the flanges of the third support 142. The caps 186, 202 are then secured to the lower portion 182 of the first bracket 122 and the lower portion 198 of the second bracket 126 such that each isolator bushing 170, 174 is compressed at least partially. The float arm 110 and the center flex frame 114 may be uncoupled from one another by reversing this process.

Conventional designs include three sets of flanges on the float arm that must be aligned with associated flanges and spacers on the flex frame while a bolt is passed through each set of flanges. This design is cumbersome and tedious, and is made more difficult by the close tolerance requirements between the coupled components. In contrast, the structure of the first and second brackets 122, 126 facilitates quick assembly and disassembly of the floating frame and flex frame 114. Because the first bolt 150 and the first isolator bushing 170 may be coupled to the first flex frame 114 before coupling to the first bracket 122, the operator can essentially build the connection in stages, rather than aligning all of the brackets and inserting the bolts 150, 158 and bushings 170, 174 simultaneously.

Figure 7:
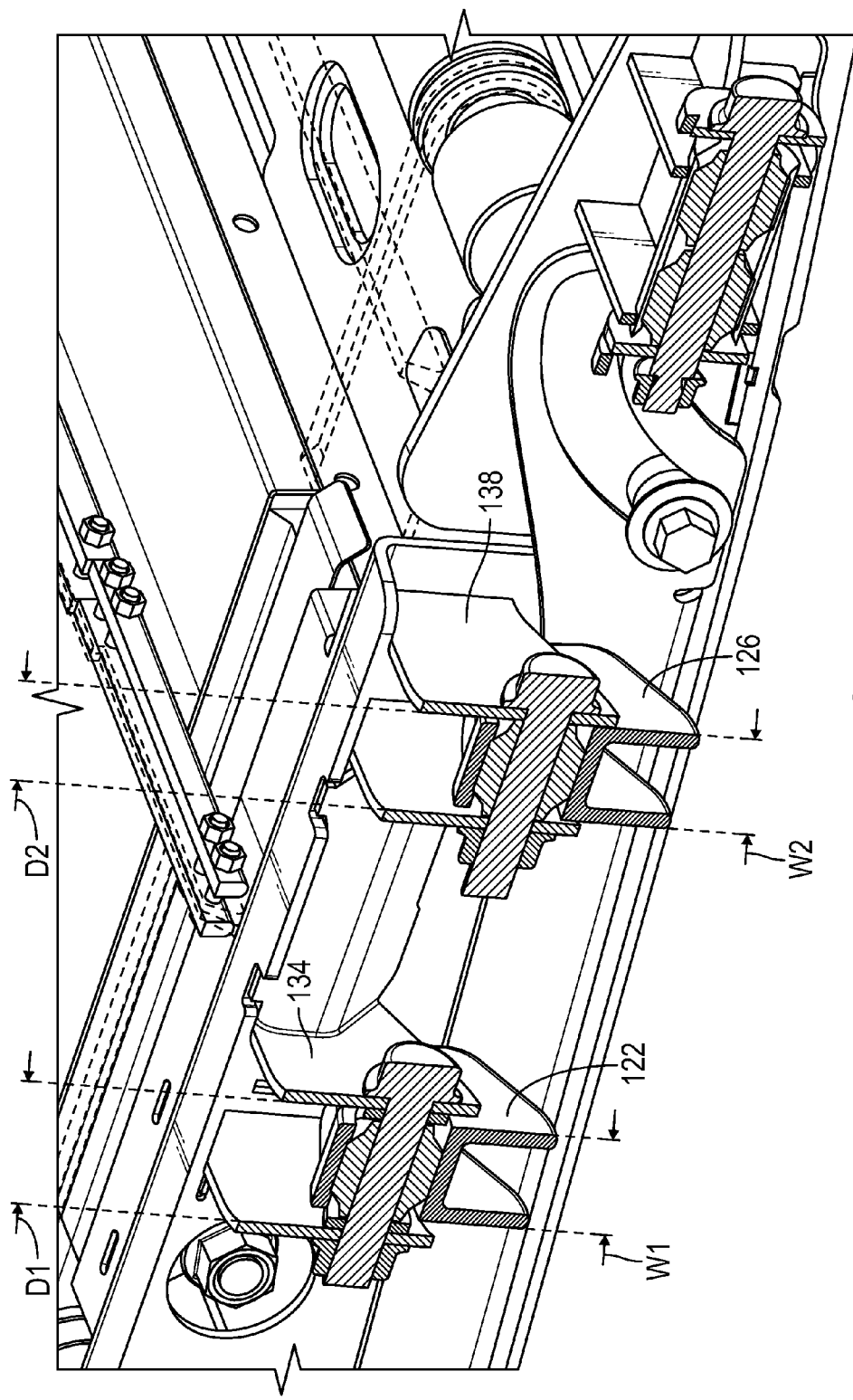
FIG. 7 is a sectional perspective view of the flex frame and float arm of FIG. 4 viewed along section 7-7.

Furthermore, the first bracket 122 and the second bracket 126 still provide the necessary tolerance stack-up during both initial assembly and operation of the header 22. For example, as shown in FIG. 7, the second bracket 126 has a width W2 that is substantially equal to (e.g., within a reasonable tolerance of) the distance D2 between the flanges of the second support 138, and the position of the second bracket 126 is controlled by this dimension. The first bracket 122 has a width W1 that is narrower than the distance D1 between the pair of flanges of the first support 134, accounting for some deviations from the nominal dimension within an acceptable tolerance.

Although FIGS. 4-7 illustrate one portion of the floating frame (particularly the portion supporting the right side conveyor 70), it is understood that a similar structure may be included on the other floating frame portion.

Figure 9:
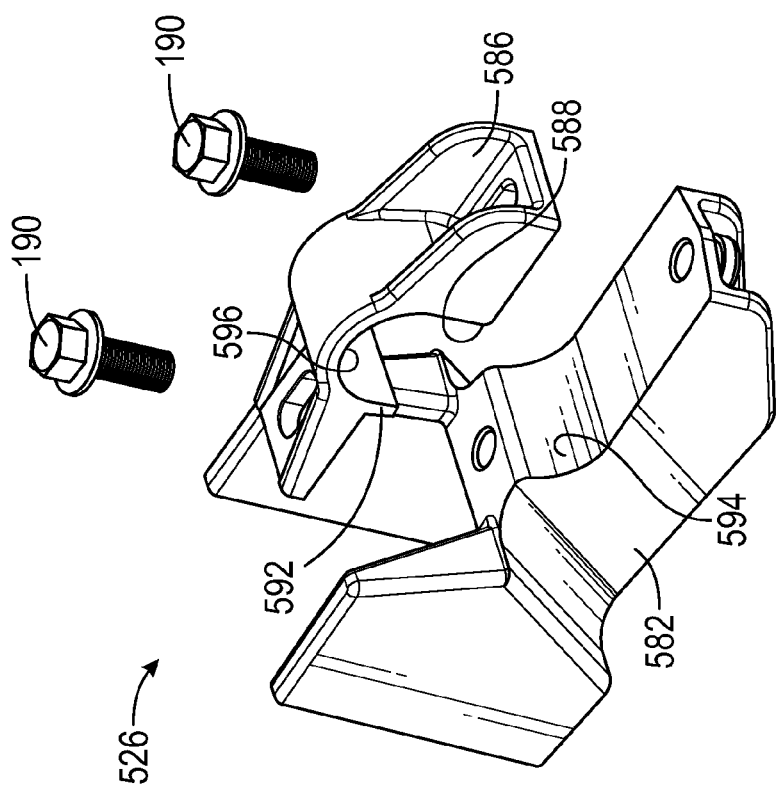
FIG. 9 is an exploded view of a bracket according to another embodiment.

FIG. 9 illustrates a second bracket 526 according to another embodiment. Unlike the embodiment of FIG. 8 in which the lower portion 182 forms a U-shaped cradle 194, the second bracket 526 of FIG. 9 includes an L-shaped lower portion 582. In addition, one side of the cap 586 includes a leg 588 extending along and defining a first side of the groove 596. The lower portion 582 forms a substantially flat surface that engages the leg 588. Stated another way, the opening formed between the lower portion 582 and the cap 586 is asymmetric about the line of separation between the lower portion 582 and the cap 586. In the illustrated embodiment, a projection 592 extends along and defines a second side of the groove 596 opposite the leg 588. When the cap 586 is coupled to the lower portion 582, the projection 592 extends around a portion of the first bolt 150 and first isolator bushing 170 to provide additional compression on the first isolator bushing 170.

Although certain aspects have been described in detail with reference to certain preferred embodiments, variations and modifications exist within the scope and spirit of one or more independent aspects as described. Various features and advantages are set forth in the following claims.

What is claimed is:

1. A header for an agricultural harvesting machine, the header comprising:
   a cutting bar for cutting agricultural material;
   a first frame portion including a conveyor for moving cut material, a pair of supports, and a pin extending between the supports, the pin secured to the supports;
   a second frame portion including a conveyor for moving cut material; and
   a bracket assembly for pivotably coupling the second frame portion to the first frame portion, the bracket including a first portion and a second portion removably coupled to the first portion such that the pin is positioned between the first portion and the second portion.

2. The header of claim 1, wherein the first portion includes a trough and the pin is received within the trough.

3. The header of claim 2, wherein the second portion includes a groove such that the groove and trough form an enclosed opening when the second portion is secured to the first portion.

4. The header of claim 3, wherein the enclosed opening is symmetric about the line of separation between the first portion and the second portion.

5. The header of claim 3, wherein the second portion includes a leg extending around a first portion of the groove and a projection extending around a second portion of the groove opposite the first portion.

6. The header of claim 1, further comprising a first bushing extending around the pin, wherein coupling the second portion to the first portion compresses the bushing between the pin and the bracket assembly.

7. The header of claim 1, wherein the bracket assembly is a first bracket assembly and the pair of supports is a pair of first supports, wherein the first frame portion includes a pair of second supports and a second pin extending between the second supports and secured to the second supports, the second supports extending parallel to the first supports, the header further comprising a second bracket assembly including a third portion and a fourth portion removably coupled to the third portion such that the second pin is positioned between the third portion and the fourth portion.

8. The header of claim 7, wherein the first supports are spaced apart from one another by a first distance, wherein the second supports are spaced apart from one another by a second distance, wherein the first bracket assembly is positioned between the first supports and has a width less than the first distance, wherein the second bracket assembly is positioned between the second supports and has a width substantially equal to the second distance.

9. An agricultural harvesting machine comprising:
   a chassis;
   a feederhouse for receiving agricultural material; and
   a header for cutting and gathering agricultural material, the header including,
      a cutting bar for cutting agricultural material;
      a first frame portion including a conveyor for moving cut material, a pair of supports, and a pin extending between the supports, the pin secured to the supports;
      a second frame portion including a conveyor for moving cut material; and
      a bracket assembly for pivotably coupling the second frame portion to the first frame portion, the bracket assembly including a first portion and a second portion removably coupled to the first portion such that the pin is positioned between the first portion and the second portion.

10. The agricultural harvesting machine of claim 9, wherein the first portion includes a trough and the pin is received within the trough.

11. The agricultural harvesting machine of claim 10, wherein the second portion includes a groove such that the groove and trough form an enclosed opening when the second portion is secured to the first portion.

12. The agricultural harvesting machine of claim 11, wherein the enclosed opening is symmetric about the line of separation between the first portion and the second portion.

13. The agricultural harvesting machine of claim 12, wherein the second portion includes a leg extending around a first portion of the groove and a projection extending around a second portion of the groove opposite the first portion.

14. The agricultural harvesting machine of claim 9, further comprising a first bushing extending around the pin, wherein coupling the second portion to the first portion compresses the bushing between the pin and the bracket assembly.

15. The agricultural harvesting machine of claim 9, wherein the bracket assembly is a first bracket assembly and the pair of supports is a pair of first supports, wherein the first frame portion includes a pair of second supports and a second pin extending between the second supports and secured to the second supports, the second supports extending parallel to the first supports, the header further comprising a second bracket assembly including a third portion and a fourth portion removably coupled to the third portion such that the second pin is positioned between the third portion and the fourth portion.

16. The agricultural harvesting machine of claim 15, wherein the first supports are spaced apart from one another by a first distance, wherein the second supports are spaced apart from one another by a second distance, wherein the first bracket assembly is positioned between the first supports and has a width less than the first distance, wherein the second bracket assembly is positioned between the second supports and has a width substantially equal to the second distance.

17. A method for coupling a first frame portion of a header for an agricultural harvesting machine to a second frame portion of the header, the first frame portion being movable relative to the second frame portion, the method comprising:
   inserting a pin between a pair of support members on the first frame portion;
   positioning the pin in a trough formed on a first bracket portion secured to the second frame portion; and
   securing a second bracket portion to the first bracket portion such that the pin is positioned between the first bracket portion and the second bracket portion.

18. The method of claim 17, wherein inserting the pin includes inserting the pin through a bushing positioned between the support members, wherein securing the second bracket portion causes the first and second bracket portions to exert a compressive force on the bushing.

19. The method of claim 17, further comprising inserting a second pin between a pair of second support members;

positioning a second pin in a second trough formed on a third bracket portion; and securing a fourth bracket portion to the third bracket portion such that the second pin is positioned between the third bracket portion and the fourth bracket portion.

20. The method of claim 17, wherein securing the second bracket portion to the first bracket portion includes positioning a portion of the pin within a groove formed on the second bracket portion.

\* \* \* \* \*